United States Patent [19]

Sato

[11] Patent Number: 4,771,621
[45] Date of Patent: Sep. 20, 1988

[54] SPEED CONTROL APPARATUS FOR EQUIPMENT FOR CONTINUOUS PROCESSING OF STEEL PLATES

[75] Inventor: Yoshiaki Sato, Hyogo, Japan

[73] Assignee: Mitsubishi Denki Kabushiki Kaisha, Tokyo, Japan

[21] Appl. No.: 889,083

[22] Filed: Jul. 24, 1986

[30] Foreign Application Priority Data

Jul. 25, 1985 [JP] Japan .................. 60-162827

[51] Int. Cl.$^4$ .............. B21B 1/24; B21B 39/02; B65H 20/24; B65H 20/34
[52] U.S. Cl. ............................ 72/8; 72/11; 72/17; 72/205; 72/252; 226/24; 226/119
[58] Field of Search .............. 72/250, 205, 17, 251, 72/252, 8, 11; 226/24, 42, 118, 119

[56] References Cited

U.S. PATENT DOCUMENTS

| | | | |
|---|---|---|---|
| 2,797,089 | 6/1957 | Lorig | 226/119 |
| 3,613,975 | 10/1971 | Knight | 226/42 X |
| 3,734,370 | 5/1973 | Shumaker | 226/119 |
| 4,360,137 | 11/1982 | Noe et al. | 226/119 X |
| 4,474,321 | 10/1984 | Komoto et al. | 226/118 X |

FOREIGN PATENT DOCUMENTS 0043150  4/1981  Japan ..................... 226/24
59-177246 10/1984 Japan .

Primary Examiner—Robert L. Spruill
Assistant Examiner—Steven B. Katz
Attorney, Agent, or Firm—Bernard, Rothwell & Brown

[57] ABSTRACT

Speed differential is detected between the entrance side and exit side of a looper, which is provided either on the feed side or on the delivery side of a central processing unit in continuous processing equipment and operates as a continuously supplying mechanism of steel plate, and positional relationship of movable rollers of the looper is detected, which virtually serves to diminish the speed differential, with reference to stationary rollers. By regulating the position of the movable rollers based upon the result of a calculation from the detected signals, the speed of the transported steel plate is controlled. First calculating apparatus calculates a relative speed differential based on the measurement of the looper entrance-side and exit-side speeds and the looper position and second calculating apparatus for calculating the optimum entrance-side speed based on the calculated result by the first calculating apparatus and the measured exit-side speed.

12 Claims, 5 Drawing Sheets

FIG. 4(ℓ)

SPEED CONTROL APPARATUS FOR EQUIPMENT FOR CONTINUOUS PROCESSING OF STEEL PLATES

BACKGROUND OF THE INVENTION

1. Field of the Invention

The present invention relates to an apparatus for controlling the position of a looper, as well as speeds of a steel plate passed therethrough, the looper being a device for continuously sending into or taking out of a central processing unit for continuous processing of steel plate or the like made endless, for example, by welding.

2. Description of the Prior Art

In equipment for continuous processing of steel plates, in general, the steel plate in a predetermined length wound around a reel is rewound as the reel is rotated and supplied to a central processing unit to be given such processing as rolling, surface treatment, or the like, and the steel plate, after being processed as desired in the central processing unit, is again wound around a reel and cut to a predetermined length and thus made into a product or half-finished product in a roll form.

Among the principal constituents of such continuous processing equipment, there is at first provided an entrance-side section including a pay-off reel assembly consisting of a plurality of reels around which steel plates of a predetermined length are wound in a roll form and a welder for joining the tail end of a steel plate supplied from one of the mentioned reels and the front end of a steel plate from another reel. And then, there is provided an entrance-side looper for feeding a steel plate continuously supplied from the above mentioned entrance-side section to the following sections such that the steel plate weaves its way through a plurality of rollers arranged therein substantially in two lines. As the section next to the entrance-side looper, there is provided a central section including the central processing unit for specified continuous processing of the steel plate, such as rolling, surface treatment, or the like. The continuous steel plate given the specific processing in the central processing unit is taken out of the central section by means of an exit-side looper of the structure corresponding to the above mentioned entrance-side looper. The thus taken out continuous steel plate is wound around a reel in a predetermined quantity in the following exit-side section and made into a product or half-finished product in a roll form. The exit-side section includes a tension reel assembly consisting of a plurality of reels around each of which a predetermined quantity of the steel plate is to be rolled and a shear for cutting the continuous steel plate wound around each of the individual reels of the tension reel assembly in a predetermined quantity.

In the continuous processing equipment for steel plates of the above described structure, since the steel plate is continuously supplied to the equipment while such operations are performed thereon as the welding by the welder in the entrace-side section, processing by the central processing unit in the central section, and cutting by the shear in the exit-side section, it is required that the traveling speed of the continuous steel plate be controlled through regulation of the position of rollers arranged in one line out of two lines constituting the entrance-side and exit-side loopers.

Therefore, there has been proposed a speed control apparatus as shown in the block diagram of FIG. 1 (Japanese Patent Laid-open No. 59-177246/1984). This apparatus is arranged based upon the following fundamental equations:

$$\frac{(V_E - V_C)^2}{2a} \geq L_{SY} - L_P \tag{1}$$

$$V_E - V_C \geq 0 \tag{2}$$

where
 $V_E$—Entrance-side speed
 $V_C$—Exit-side speed
 $a$—Rate of acceleration/deceleration on the entrance side
 $L_{SY}$—Looper synchronization set position
 $L_P$—Present looper position.

In FIG. 1, the entrance-side speed (looper entrance-side speed) $V_E$ is measured by the entrance-side speed measuring circuit 13, the central speed (looper exit-side speed) $V_C$ is measured by the central speed measuring circuit 12, and the present looper position $L_P$ is measured by the looper position measuring circuit 14. The central speed (looper exit-side speed) $V_C$, entrance-side speed $V_E$, and the present looper position $L_P$ measured by these measuring circuits 12, 13, and 14 are input to the looper synchronized position control circuit 15, and in this circuit 15, the looper synchronization set position is determined through predetermined calculation. According to the thus determined looper synchronization set position, an entrance-side set speed $V_{E\,REF}$ is output from the entrance-side speed normalizing circuit 11 and the steel plate supplying speed of the entrance-side looper is thus controlled.

The prior art speed control apparatus operates as indicated in the time chart of FIG. 2. Namely, in the case where the looper entrance-side speed $V_E$ and the looper exit-side speed $V_C$ are different, the speed control is exercised such that the looper changes its position and deceleration is started at a predetermined rate of deceleration (e, FIG. 2), and after the decelerating operation has been performed for a predetermined period of time (T₂, FIG. 2), the looper exit-side speed $V_C$ and the entrance speed $V_E$ are put in synchronism (d, FIG. 2).

According to the prior art speed control apparatus as described above, however, in the middle of the decelerating process of the looper entrance-side speed $V_E$ after the same has been started to be decelerated (e, FIG. 2) in order that the same may be synchronized with the looper exit-side speed $V_C$, if, for example, the looper exit-side speed $V_C$ is accelerated, it took a considerably long period of time to achieve the synchronization between both the speeds and it was a problem in the prior art. More particularly, if the looper exit-side speed $V_C$ is accelerated at the point a in FIG. 2, the entrance-side speed $V_E$ is decelerated until it is brought to the point (b, FIG. 2) where the same becomes equal to the exit-side speed $V_C$ which is at the speed-increasing inclination, but, from this point on, the entrance-side speed $V_E$ becomes to be accelerated, not continued to be decelerated. Therefore, although the syncrhonization should have been completed within a predetermined period of time T₂, it is caused by the change in the middle of the course to exceed the predetermined period of time T₂ and require the period of time T₁ down to the point (c, FIG. 2) where the entrance-side speed $V_E$ and the exit-side speed $V_C$ are put in synchronization. Thus, in the prior art speed control apparatus in which the entrance-side speed $V_E$ was accelerated or decelerated to come in synchronization with the exit-side speed at the constant rate of acceleration/deceleration $\alpha$, if there occurred some change in the exit-side speed $V_C$, the entrance-side speed $V_E$ was first accelerated to become faster than the synchronous speed and then decelerated according to the rate of acceleration/deceleration $\alpha$, and so, the speed control was retarded and it took a long time before the control is achieved.

SUMMARY OF THE INVENTION

A primary object of the present invention is to shorten the time required for achieving synchronization control at the time of speed controlling of the looper entrance-side speed so that the same may be synchronized with the looper exit-side speed.

The control apparatus for continuous processing equipment for steel plates according to the present invention comprises optimum speed differential calculating means for calculating a relative speed differential based on the looper entrance-side and exit-side speeds as well as positional data of the looper, which is provided in the continuous processing equipment as a steel plate transporting mechanism, and looper entrance-side speed calculating means for calculating the optimum speed on the looper entrance side from the result of the above mentioned calculation and the looper exit-side speed.

The optimum speed differential calculating means of the invention calculates the relative speed differential between the entrance side and the exit side from the rate of relative acceleration/deceleration between the entrance side and the exit side, so that the looper entrance-side speed may be controlled with reference to the looper exit-side speed based on the calculated relative speed differential. Therefore, the synchronization control of the looper can be completed within a shorter period of time.

DESCRIPTION OF THE PREFERRED EMBODIMENTS

One preferred embodiment of the present invention will be described with reference to the accompanying drawings in the following.

Figure 3:
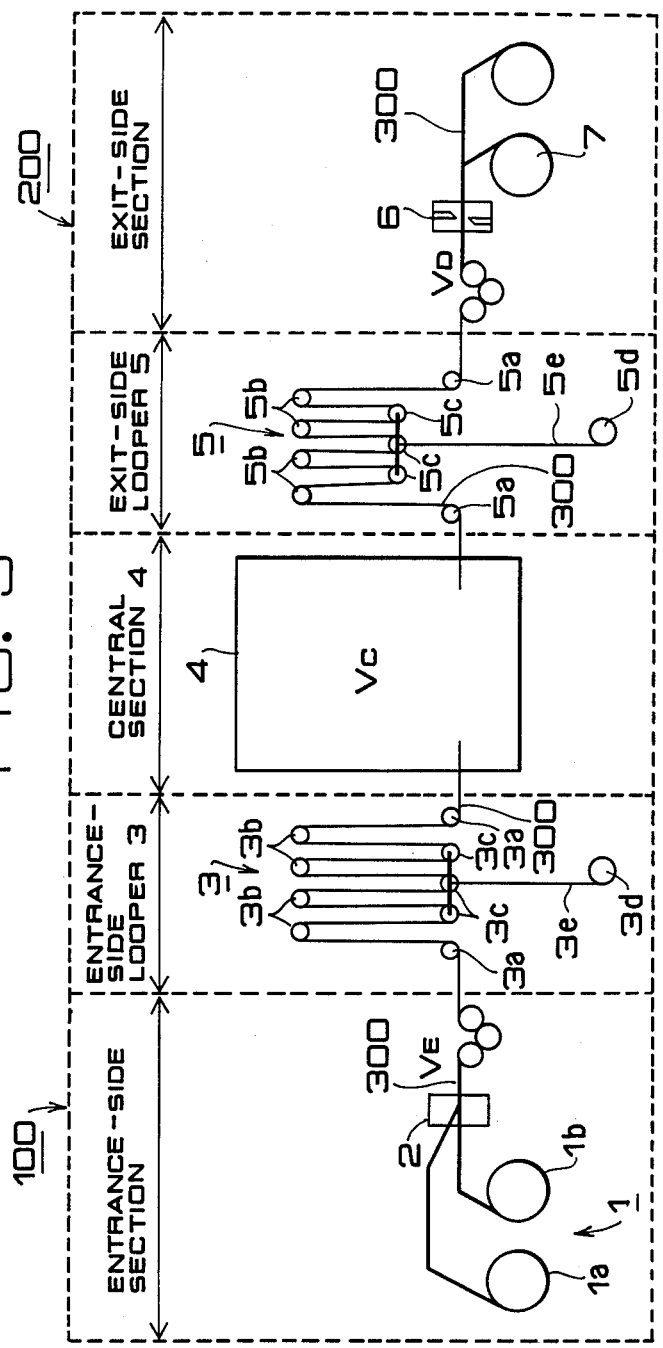
FIG. 3 is a structural drawing schematically showing structure of continuous processing equipment for steel plates to which the speed control apparatus according to the present invention is applied.
Figure 4A:
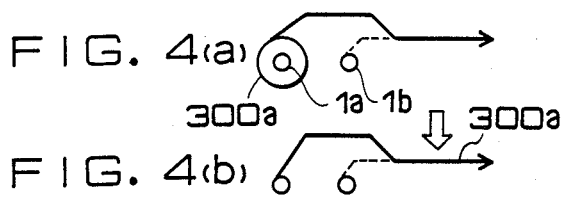
FIGS. 4 (a)–(l) are explanatory drawings of operations showing in detail the state of operations in the entrance-side section of FIG. 3 in the continuous processing equipment for steel plates to which the speed control apparatus of the invention is applied.
Figure 4B:
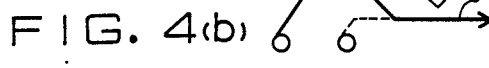
Figure 4C:
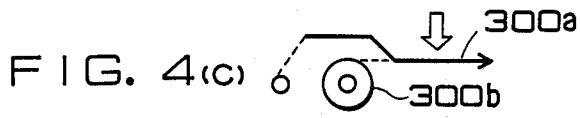
Figure 4D:
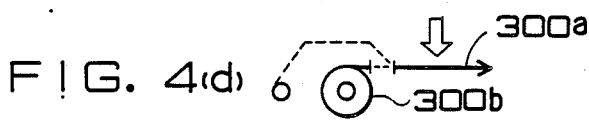
Figure 4E:
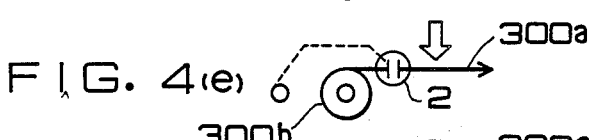
Figure 4F:
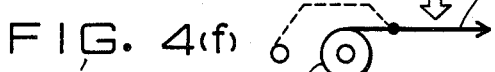
Figure 4G:
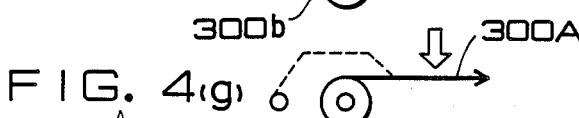
Figure 4H:
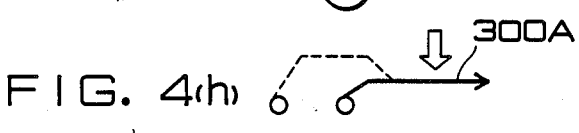
Figure 4I:
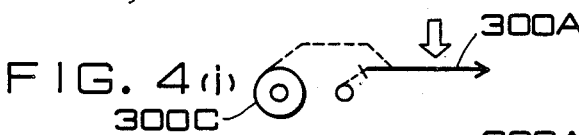
Figure 4J:
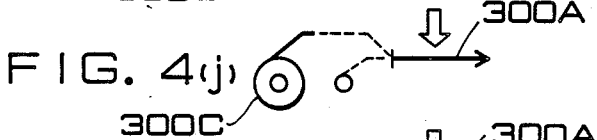
Figure 4K:
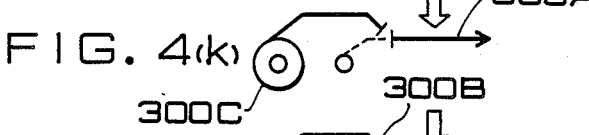

FIG. 3 is a drawing showing schematic structure of a portion of continuous processing equipment for steel plates in a steel plant having the above described loopers. Referring to the drawing, 1 denotes a pay-off reel assembly including two reels 1a, 1b provided in the entrance-side section 100 and around which the steel plate 300 is wound in a coil, 2 denotes a welder likewise provided in the entrance-side section for welding the steel plates 300 that are wound around the mentioned pay-off reel assembly 1, and 3 denotes an entrance-side looper (looper) for storing up and paying out the steel plate 300 according to the entrance side speed and the exit side speed. Reference numeral 4 denotes the central section for continuously processing the steel plate 300 delivered from the entrance-side looper 3, 5 denotes an exit-side looper operating similarly to the mentioned entrance-side looper 3, 6 denotes a shear provided in the exit-side section 200 for cutting the steel plate to a predetermined length, and 7 denotes a tension reel assembly for taking up the steel plate 300 cut by the shear 6.

Figure 5:
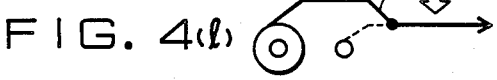
FIG. 5 is a detailed explanatory drawing showing an important portion of the entrance-side looper of one embodiment of FIG. 3 for the continuous processing equipment for steel plate to which the speed control apparatus of the present invention is applied.
Figure 5:
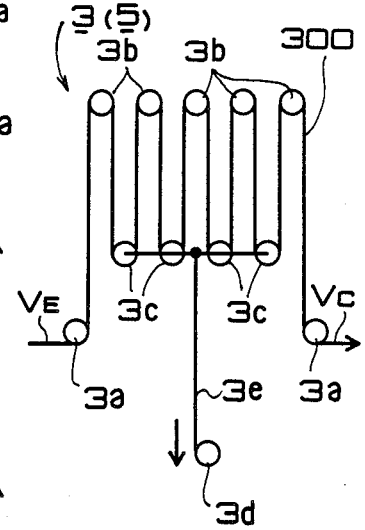
Figure 6A:
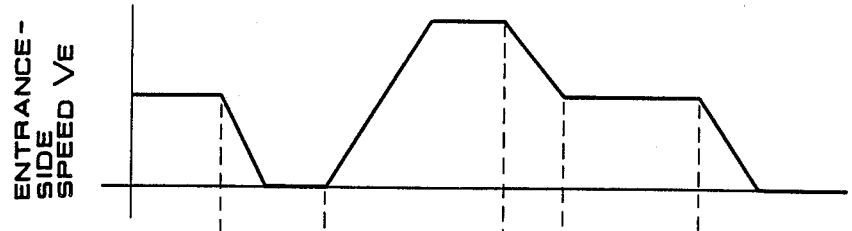
FIG. 6 is a time chart showing speed patterns in the entrance-side looper and the central section of the embodiment of FIG. 3.
Figure 6B:
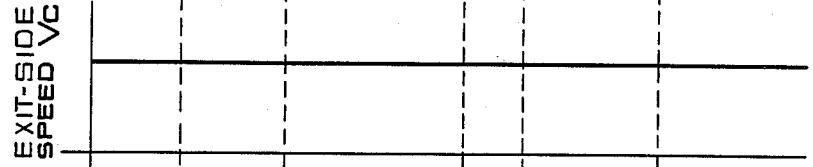
Figure 6C:
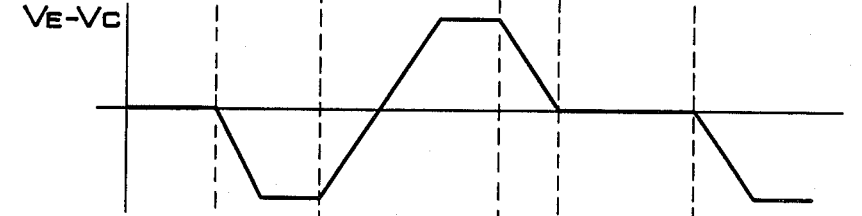
Figure 6D:
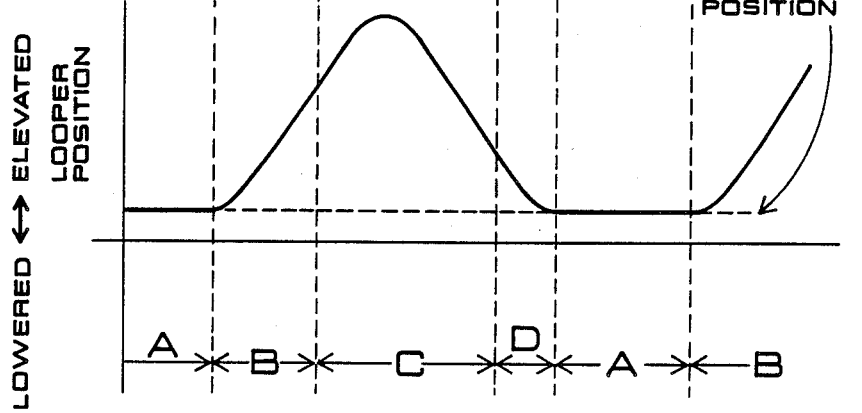

Operations of the continuous processing equipment of steel plates with the described arrangement will be described with reference to FIGS. 4 (a)–(l) and FIG. 5.

To begin with, the operations of the pay-off reel assembly 1 and the welder 2 in the entrance-side section 100 of general continuous processing equipment will be described referring to FIGS. 4 (a)–(l). In FIG. 4 (a), the steel plate 300a wound around the reel 1a as indicated is uncoiled and fed through the entrance-side looper 3 in FIG. 3 to the central section 4 as indicated in FIGS. 4 (b), (c). When, in FIG. 4 (d), the tail end of the steel plate 300a reaches the welder 2, the feed of the steel plate 300a is stopped, with the tail end kept at a standstill within the welder 2. Then, the steel plate 300b wound around the reel 1b in a coil in advance is uncoiled (FIG. 4 (d)). The front end of the steel plate 300b is stopped within the welder 2 (FIG. 4 (e)), where both this front end of the steel plate 300b and the above mentioned tail end of the steel plate 300a standing still within the welder 2 are welded by the welder 2 (FIG. 4 (f)) so that a joined steel plate 300A is provided (FIG. 4 (g)). Thereafter, the steel plate 300b on the reel 1b is fed through the entrance-side looper 3 to the central section 4, and when the steel plate 300b is entirely uncoiled (FIG. 4 (i)), the next steel plate 300c is uncoiled in the same manner as described above (FIG. 4 (j)), welded (FIG. 4 (k)), and delivered as a joined steel plate 300B (FIG. 4(l)). In the described manner, the steel plates 300a, 300b, and 300c wound around the reels 1a, 1b are delivered from the entrance-side section 100 to the entrance-side looper 3 as a joined steel plate 300B.

Now, before describing the operation of the entrance-side looper 3, the detailed structure of the entrance-side looper 3 and the exit-side looper 5 will be described with reference to FIG. 5.

Referring to FIG. 5, 3a, 3b, and 3c denote rotatable rollers, out of which the rollers 3a and 3b are rotatably fixed in a predetermined position and the rollers 3c, also called a carriage, are connected in a line form and move up and down with each roller adapted to be rotatable. Reference numeral 3d denotes a fixed drum for simultaneously pulling down the plurality of rollers c with constant force through a lowering rope 3e, and the drum is usually driven by a d.c. motor (not shown).

The operation of the entrance-side looper 3 will now be described with reference to FIG. 5. The entrance-side looper 3 operates so as to store the steel plate 300 in between the fixed rollers 3b and the movable rollers 3c within the entrance-side looper 3 by lowering the movable rollers 3c, called the carriage, by means of the lowering wire 3e taken up by the drum 3d and also operates so as to pay the steel plate 300 out of the fixed roller 3a on the exit side of the entrance-side looper 3 by elevating the movable rollers 3c. Therefore, the rollers 3c are moved up and down according to the speeds in the entrance-side looper 3 on the entrance side (the side of the entrance-side section 100) and on the central side (the side of the central section 4). More particularly, when the entrance-side speed $V_E$ is higher than the central speed $V_C$, the drum 3d is brought into the take-up state to lower the rollers 3c so as to store in the entrance-side looper 3 the steel plate 300 corresponding to the entrance-side speed $V_E$—the central speed $V_C$. Conversely, when the entrance-side speed $V_E$ is lower than the central speed $V_C$, the drum 3d is brought into the rewind state to elevate the movable rollers 3c so as to pay out the steel plate 300 corresponding to the central speed $V_C$—the entrance-side speed $V_E$. When, however, the entrance-side speed $V_E$=the central speed $V_C$, the drum 3d stops whereby the movable rollers 3c are stopped without making any up and down motion. An operation similar to that in the entrance-side looper 3 is performed in the exit-side looper 5.

Now, the operations of the continuous processing equipment in which the above described individual operations are performed will be described with reference to FIG. 3. When the steel plate on the pay-off reel 1a in the entrance-side section 100 is unwound to the side of the entrance-side looper 3 and the tail end thereof is stopped within the welder 2 as indicated in FIG. 4 (d), the steel plate on the pay-off reel 1b is started to be unwound and stops within the welder 2 as indicated in FIG. 4 (e), whereupon the first end thereof and the tail end of the steel plate on the pay-off reel 1a are welded and the steel plates 300a and 300b on the pay-off reels 1a and 1b are made into a joined, continuous steel plate 300A. Within the entrance-side looper 3, the drum 3d as indicated in FIG. 5 is driven to move the rollers 3c up and down according to the speed differential caused at the time of the welding between the entrance-side speed $V_E$ and the central speed $V_C$ on the side of the central section 4, whereby storing up and paying out of the steel plate 300 is performed and the speed differential is compensated. The steel plate 300 is given continuous processing in the central section 4 and delivered to the exit-side looper 5. An operation similar to that made in the above described entrance-side looper 3 is performed in the exit-side looper 5, and the thus delivered steel plate 300 from the exit-side looper 5 comes into the exit-side section 200, where the same is cut to a predetermined length by the shear 6 and wound around the tension reel 7. The described changes in the state are indicated by the time chart of FIG. 6.

FIG. 6 (a) indicates the speed pattern in the entrance-side section 100, FIG. 6 (b) indicates the speed pattern in the central section 4, FIG. 6 (c) indicates the speed differential between the entrance-side section 100 and the central section 4, and FIG. 6 (d) indicates the changes in the position of the entrance-side looper 3. Throughout the above FIGS. 6 (a) to (d), the portion A corresponds to the state where the entrance-side speed and the central speed in the entrance-side looper 3 are equal, the portion B corresponds to the state where the entrance-side is decelerated to be stopped for welding and the welding is performed after the stopping, the portion C corresponds to the state where, after the welding has been completed, the entrance-side speed is accelerated to the highest speed so that the position of the entrance-side looper 3 may be shifted to the synchronized position, and the portion D corresponds to the state where the synchronized position is approached and the entrance-side speed is decelerated so as to be put in synchronism with the central speed.

Figure 7:
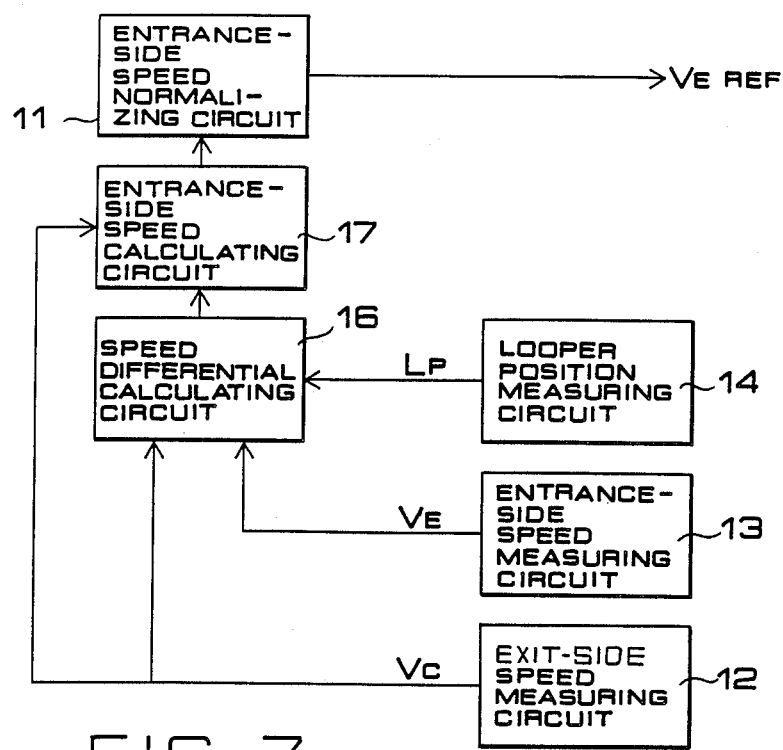
FIG. 7 is a block diagram showing the structure of the speed control apparatus according to one embodiment of the invention.
Figure 8:
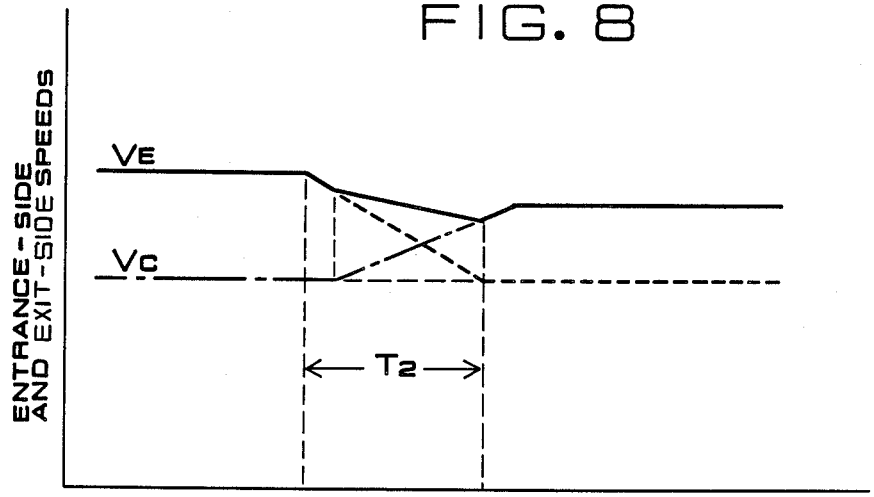
FIG. 8 is a time chart showing the state of speed control by the speed control apparatus of FIG. 7.

The speed control apparatus according to the present invention to be applied to the continuous processing equipment for steel plates to operate as described above will be described now with reference to FIGS. 7 and 8.

Figure 1:
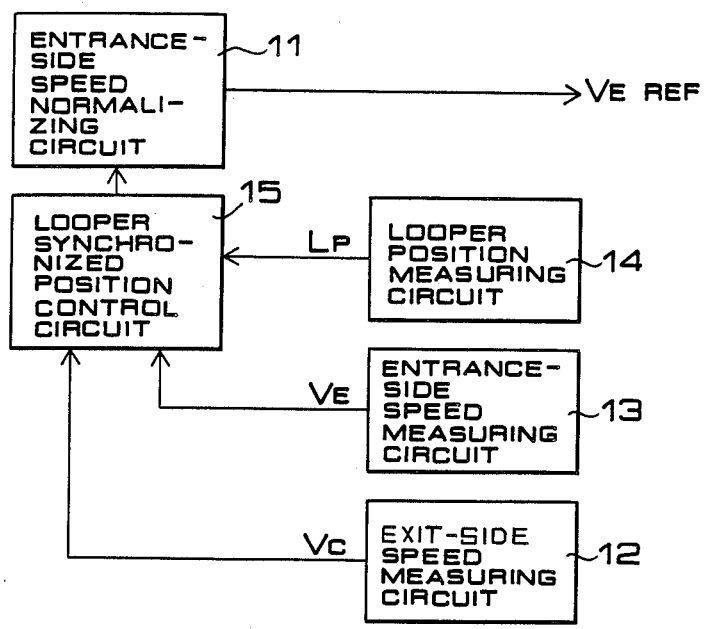
FIG. 1 is a block diagram showing structure of a prior art speed control apparatus for continuous processing equipment for steel plates.
Figure 2:
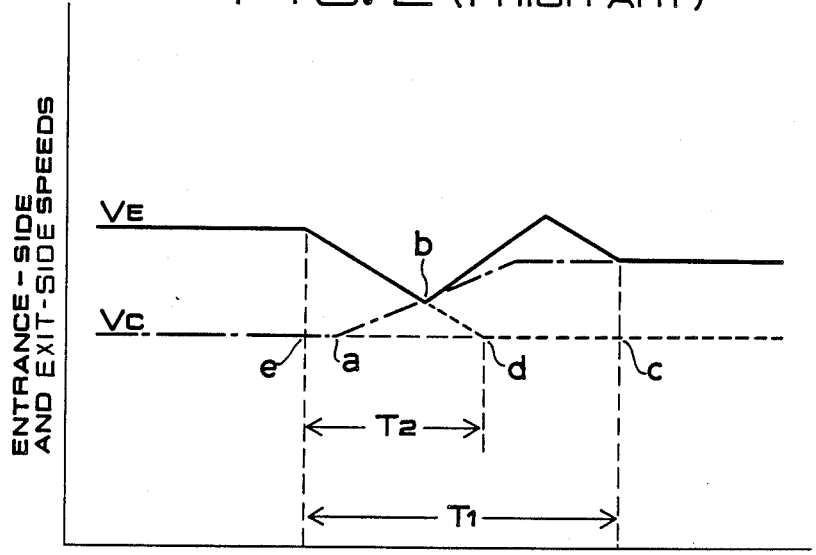
FIG. 2 is a time chart showing state of speed control in the prior art speed control apparatus.

To begin with, the arrangement of the speed control apparatus according to the invention will be described with reference to FIG. 7. Since reference numerals 11–14 in FIG. 7 denote the same parts as those of the prior art described with reference to FIG. 1, duplicated description of the same will be omitted. Reference numeral 16 denotes a speed differential calculating circuit for calculating the speed differential between the entrance side and the central side (exit side) necessary for bringing about the looper synchronized position, from measured results of the entrance-side speed, central (exit-side) speed, and the looper position, and 17 denotes an entrance-side speed calculating circuit for calculating the optimum entrance-side speed from the optimum speed differential between the entrance and the central side (exit side) calculated by the speed differential computing circuit 16 and the central (exit-side) speed. The entrance-side speed and the exit-side speed may be measured by counting the revolutions of the rollers 3a at the entrance and exit sides, respectively, of the looper 3. The looper position may be determined, for example, by measuring the length of the wire 3e between the drum 3d and the movable rollers 3c.

In the speed control apparatus arranged as described above, the principle governing the speed differential computing circuit 16 is given by $$\frac{(V_E - V_C)^2}{2\beta} \geqq L_{SY} - L_P \quad (3)$$

$$V_E - V_C \geqq 0 \quad (4)$$

where $\beta$ is the ratio of relative acceleration and deceleration between the entrance side and the central side (exit side). In this arrangement what will determine the position of the entrance-side looper 3 is not the entrance-side speed $V_E$ and the central speed $V_C$, but the speed differential between both the speeds. Therefore, in the event of a change in the central speed $V_C$, the synchronization can be achieved with a predetermined period of time by giving the entrance-side speed $V_E$ to provide the necessary speed differential. Once the controlling of the looper synchronization has been started according to the above mentioned equations (3) and (4), it is thereafter only required to provide the speed differential between the entrance side and the central side (exit side) according to $$V_E - V_C = \sqrt{2\beta \cdot (L_{SY} - L_P)},  \quad (5)$$

hence the entrance-side speed to be set is calculated by $$V_{E\,REF} = V_C + \sqrt{2\beta \cdot (L_{SY} - L_P)}. \quad (6)$$

The state of speed control exercised as described above is indicated in the time chart of FIG. 8. As apparent from FIG. 8, the entrance speed $V_E$ is always set in the speed control apparatus of the invention so that the speed differential between the entrance side and the central side (exit side) may become a predetermined value, and so, the controlling for synchronization is completed within a predetermined period of time $T_2$ even if the central (exit-side) speed $V_C$ is changed during the controlling for synchronization.

With reference to the above described embodiment, explanation was made only about the entrance-side looper 3 of the continuous processing equipment but the same effect as in the above described embodiment can be obtained from the exit-side looper 5 of the same structure.

Further, the same effect can be obtained in other plants than the steel plant if the continuous processing equipment is such that is provided with the above described looper.

As described so far, since in the present invention the optimum value of the speed differential between the entrance side and the exit side of the looper is calculated from the entrance-side speed, central speed and the position of the looper, and the entrance-side speed is directly calculated from the result of the above mentioned calculation, such an effect is obtained that the controlling for synchronization of the looper is achieved within a shorter period of time.

What is claimed is:

1. In a speed control apparatus for controlling feeding or delivering speed of a steel plate in continuous processing equipment for steel plates having a central processing unit for giving predetermined processing to an endless steel plate continuously supplied thereto and a looper provided on the steel plate feed side of the central processing unit or the steel plate delivery side thereof for sending the continuous steel plate into the central processing unit or taking the same out thereof, said looper including movable rollers, said speed control apparatus for continuous processing equipment of steel plates comprising:

entrance-side speed detecting means for detecting steel plate transporting speed on the entrance side of said looper;

exit-side speed detecting means for detecting steel plate transporting speed on the exit side of said looper;

looper position detecting means for detecting a position of said movable rollers;

optimum speed differential calculating means for calculating optimum speed differential between the entrance-side speed and the exit-side speed of said looper from a relative speed differential based on the results of detection by said three detecting means in order that said movable rollers may be regulated, according to the detected results by said detecting means, to take the optimum position where the entrance-side speed is synchronized with the exit-side speed of said looper; and entrance-side speed calculating means for calculating optimum speed on the entrance side of said looper from the result of calculation by said optimum speed differential calculating means and the result of detection by said exit-side speed detecting means.

2. A speed control apparatus for continuous processing equipment for steel plates according to claim 1, wherein said looper is constituted of stationary rollers mounted on shafts and fixedly positioned on the entrance side and the exit side and movable rollers disposed in between said stationary rollers and movable in a direction perpendicular to a line extending through the shafts of the stationary rollers.

3. A speed control apparatus for continuous processing equipment for steel plates according to claim 2, wherein said looper is constituted of first stationary rollers fixedly positioned on the entrance side of the exit side respectively, a group of second stationary rollers, said second stationary rollers being disposed in a line in parallel with said line extending through the shafts of said first stationary rollers and kept a predetermined distance away therefrom, and a plurality of movable rollers, said movable rollers being disposed in parallel with said second stationary rollers and movable in a direction perpendicular to said line in which the shafts of said second stationary rollers are disposed.

4. A speed control apparatus for continuous processing equipment for steel plates according to claim 2, wherein said movable rollers of said looper are mounted on shafts, and further including means for moving said movable rollers, said moving means comprising a connecting member connecting the shafts of said movable rollers and a wire having one end connected to said connecting member and the other end connected to a rotatable drum, said moving means effecting movement of said movable rollers relative to said stationary rollers.

5. A speed control apparatus for continuous processing equipment for steel plates according to claim 3, wherein said entrance-side speed detecting means is provided on the stationary roller at the entrance side of said looper and constituted of a speed measuring circuit for detecting traveling speed of a steel plate by counting the number of revolutions of said stationary roller at the entrance side.

6. A speed control apparatus for continuous processing equipment for steel plates according to claim 3, wherein said exit-side speed detecting means is provided on the stationary roller on the exit side of said looper and constituted of a speed measuring circuit for detecting travelling speed of a steel plate by counting the number of revolutions of said roller at the exit side.

7. A speed control apparatus for continuous processing equipment for steel plates according to claim 3, wherein said looper position detecting means is constituted of a looper position measuring circuit for measuring the distance of the movable rollers from a line extending through the shafts of the stationary roller on the entrance side and the stationary roller on the exit side thereby to detect the position of said looper.

8. A speed control apparatus for continuous processing equipment for steel plates according to claim 3, wherein said looper position measuring circuit is constituted of a looper position measuring circuit for measuring the distance of the movable rollers from a line extending through the shafts of the stationary roller on the entrance side and the stationary roller on the exit side, and further including a rotatable drum and a wire having one end connected to said drum and the other end connected to said movable rollers, said looper position measuring circuit measuring the length of wire between said drum and said movable rollers.

9. A speed control apparatus for continuous processing equipment for steel plates according to claim 3, wherein said movable rollers of said looper are mounted on shafts and further including means for moving said movable rollers, said moving means comprising a connecting member connecting the shafts of said movable rollers and a wire having one end connected to said connecting member and the other end connected to a rotatable drum, said moving means effecting movement of said movable relative to said stationary rollers.

10. A speed control apparatus for continuous processing equipment for steel plates according to claim 1, wherein said optimum speed differential calculating means is constituted of an optimum speed differential calculating circuit receiving as an electric signal each of the speed detected by the looper entrance-side speed detecting means, the speed detected by the looper exit-side speed detecting means, and the looper positioning detected by the looper position detecting means and, after making calculation based on processing said signals, delivering an optimum speed differential signal to the entrance-side speed calculating means.

11. A speed control apparatus for continuous processing equipment for steel plates according to claim 1, wherein said entrance-side speed calculating means is constituted of an entrance-side speed calculating circuit receiving the optimum speed differential signal output from said optimum speed differential calculating circuit and the exit-side speed detected signal output from said exit-side speed detecting means and, after making calculation based on processing said signals, delivering an entrance-side speed signal to an entrance-side speed normalizing circuit.

12. A speed control apparatus for continuous processing equipment for steel plates according to claim 1, wherein said optimum speed differential calculating means calculates an entrance-side speed $V_{E\,REF}$ to be set on the basis of the following equation, $$V_{E\,REF} = V_C + \sqrt{2\beta \cdot (L_{SY} - L_P)}$$

where $V_{E\,REF}$ is an entrance-side speed (reference value), $V_C$ is an exit-side speed, $\beta$ is a rate of acceleration/deceleration on the entrance-side, $L_{SY}$ is a looper synchronization set position, and $L_P$ is a present looper position.

* * * * *

UNITED STATES PATENT AND TRADEMARK OFFICE
CERTIFICATE OF CORRECTION

PATENT NO. : 4,771,621
DATED : September 20, 1988
INVENTOR(S) : Yoshiaki Sato

It is certified that error appears in the above-identified patent and that said Letters Patent is hereby corrected as shown below:

Column 2, line 62, "syncrhonization" should be --synchronization--.

Column 5, line 41, "first" should be --front--.

Signed and Sealed this

Eighth Day of August, 1989

Attest:

DONALD J. QUIGG

*Attesting Officer*  *Commissioner of Patents and Trademarks*